(12) United States Patent
Kouchi et al.

(10) Patent No.: US 8,307,845 B2
(45) Date of Patent: Nov. 13, 2012

(54) FLOW RATE CONTROLLER

(75) Inventors: Mizuho Kouchi, Gyoda (JP); Hiroki Igarashi, Gyoda (JP)

(73) Assignee: Surpass Industry Co., Ltd., Gyoda-Shi, Saitama (JP)

( * ) Notice: Subject to any disclaimer, the term of this patent is extended or adjusted under 35 U.S.C. 154(b) by 133 days.

(21) Appl. No.: 12/698,503

(22) Filed: Feb. 2, 2010

(65) Prior Publication Data

US 2010/0200083 A1   Aug. 12, 2010

(30) Foreign Application Priority Data

Feb. 10, 2009   (JP) ................................ 2009-028529

(51) Int. Cl.
*G01F 1/36* (2006.01)
(52) U.S. Cl. .................. 137/486; 137/487.5; 137/552.7; 137/554; 137/557; 702/47; 73/1.25; 700/282
(58) Field of Classification Search ............... 137/487.5, 137/552.7, 554, 557, 486; 73/1.25, 1.26; 702/45, 47; 700/282
See application file for complete search history.

(56) References Cited

U.S. PATENT DOCUMENTS 6,302,130 B1 * 10/2001 Ohmi et al. ..................... 137/14
2010/0070240 A1 * 3/2010 Yasuda et al. ................. 702/183

FOREIGN PATENT DOCUMENTS

| EP | 1921530 A1 | 5/2008 |
|---|---|---|
| JP | 05-233068 A | 9/1993 |
| WO | WO 2008/007829 A1 | 1/2008 |
| WO | WO 2008/053839 A1 | 5/2008 |

OTHER PUBLICATIONS

Office Action for corresponding European Patent Application No. 10152975.8, dated May 25, 2011.

* cited by examiner

*Primary Examiner* — William McCalister
(74) *Attorney, Agent, or Firm* — Thomas & Karceski, PC

(57) ABSTRACT

A flow rate controller detects a clogged state of an orifice to prevent errors during flow rate measurement. The flow rate controller includes a differential pressure flow meter, with an orifice disposed between a pair of pressure sensors, that converts a pressure difference detected by the two pressure sensors into a flow rate, a flow-rate adjusting valve whose degree of opening is controlled such that the difference between a measured flow rate value and a preset flow rate value falls within a predetermined range, and a control unit that controls the degree of opening of the flow-rate adjusting valve upon receiving the pressure values detected by the pressure sensors. The control unit compares the preset flow rate value and the measured flow rate value and determines that there is a clog fault when a flow rate difference, as compared with a predetermined value, continues for a predetermined time period.

2 Claims, 6 Drawing Sheets

FLOW RATE CONTROLLER

CROSS-REFERENCE TO RELATED APPLICATION(S)

This is a United States Non-Provisional Patent Application that relies for priority on Japanese Patent Application No. 2009-028529, tiled on Feb. 10, 2009, the contents of which are incorporated herein by reference.

BACKGROUND OF THE INVENTION

1. Field of the Invention

The present invention relates to a flow rate controller that is employed in fluid transport pipes for various industrial fields, for example, chemical factories, semiconductor manufacturing, food processing, biotechnology, and so on.

2. Description of Related Art

Conventionally, differential pressure flow meters, which measure the flow rate of fluid, have been widely employed. Such a differential pressure flow meter is provided with pressure sensors before and after an orifice and is employed installed at a location for measuring the fluid pressure of fluid containing corrosive chemicals, such as high purity nitric acid, hydrochloric acid, and hydrofluoric acid, for example, as in semiconductor manufacturing processes. To give a specific example, in the case of semiconductor manufacturing apparatuses, a reagent containing hydrofluoric acid is used in etching of a semiconductor substrate, and therefore, a differential pressure flow meter is installed in a circulation circuit of the reagent in order to stably supply the reagent.

In other words, by providing a pair of pressure sensors on the upstream side and the downstream side of an orifice provided in a main fluid channel, the above-described differential pressure flow meter can be used as a flow rate meter that calculates a flow rate by converting differential pressure between the two pressure sensors. In addition, by controlling the degree of opening of an adjustable valve such that there is no difference between the calculated flow rate from the flow rate meter and a preset flow rate set in advance, the flow rate meter serves as a flow rate controller that performs feedback control of the flow rate in the main fluid channel to a desired value (for example, refer to Japanese Unexamined Patent Application, Publication No. Hei 5-233068 (see FIG. 1)).

With a flow rate controller provided with the above-described differential pressure flow meter, as a condition for carrying out accurate flow rate measurement and flow rate control, it is important to the orifice at a constant degree of opening needed to measure a differential pressure.

For example, when dealing with slurry liquid, which coagulates easily, a coagulate produced by coagulation of the liquid may become attached to the orifice, thus narrowing the orifice diameter. Such coagulate attachment is the cause of an error in the measured flow rate, and therefore, it is desirable that orifice clogging, wherein a foreign object such as a coagulate is attached to an orifice part, be detected so as to enable a quick response.

Given such a background, with a flow rate controller using a differential pressure flow meter, it is desirable that the flow rate be controlled by accurately detecting the flow rate with the differential pressure flow meter and by easily detecting a clogged state, wherein a foreign object such as a coagulate is attached to an orifice of the differential pressure flow meter.

BRIEF SUMMARY OF THE INVENTION

The present invention has been conceived in light of the above-described situation and provides a flow rate controller which is capable of preventing continued flow rate control in a state in which an error occurs during flow rate measurement, by automatically detecting a clogged state (fault) wherein a foreign object such as a coagulate is attached to an orifice.

In order to solve the above-described problem, the present invention employs the following solutions.

A flow rate controller according to one aspect of the present invention includes a differential pressure flow meter, wherein an orifice is disposed between a pair of pressure sensors provided in a straight piping section of a main fluid channel, the differential pressure flow meter carrying out flow rate measurement by converting a pressure difference obtained from two pressure values detected by the pressure sensors to a flow rate; a flow-rate adjusting valve that is provided in the main fluid channel and whose degree of opening is controlled such that the difference between a measured flow rate value of the differential pressure flow meter and a preset flow rate value determined in advance falls within a predetermined range; and a control unit that controls the degree of opening of the flow-rate adjusting valve upon receiving as inputs the pressure values detected by the pressure sensors, wherein the control unit compares the preset flow rate value and the measured flow rate value of the differential pressure flow meter and determines that there is a clog fault in the orifice when a flow rate difference equal to or greater than a predetermined value continues for a predetermined period of time or longer.

With such a flow rate controller, the control unit compares the preset flow rate value and the measured flow rate value of the differential pressure flow meter and determines that an orifice clog fault has occurred when a flow rate difference at or above the predetermined value continues for a predetermined period of time; therefore, it is possible to detect an orifice clog fault easily and accurately without having to provide additional equipment.

In the flow rate controller according to the above-described aspect of the present invention, a monitoring pressure sensor for monitoring clogging may be provided downstream of the flow-rate adjusting valve, and the control unit may compare a detected pressure value of the monitoring pressure sensor with a reference pressure value from the monitoring pressure sensor, which is determined in advance in accordance with the preset flow rate value, to determine that there is a clog fault in the orifice when a flow rate difference equal to or greater than a predetermined value continues for a predetermined period of time or longer.

With such a flow rate controller, with the mere addition of the monitoring pressure sensor for monitoring clogging, the control unit can easily and accurately detect an orifice clog fault by comparing the reference pressure value of the monitoring pressure sensor and the detected pressure value of the monitoring pressure sensor.

In the flow rate controller according to the above-described aspect of the present invention, the control unit may be configured so as to acquire a pulse position that indicates the degree of opening of the flow-rate adjusting valve, compare the pulse position with a reference position determined in accordance with an inlet pressure and the preset flow rate value, and determine that there is a clog fault when a difference therebetween continues for a predetermined time or longer.

With such a flow rate controller, by taking advantage of the feature of the flow-rate adjusting valve that when the inlet pressure changes, the flow rate changes even at the same pulse position (degree of opening), an orifice clog fault can be easily and accurately detected. Note that, in this case, a pressure value detected by a pressure sensor disposed on the upstream side of the orifice may be used as the inlet pressure.

With the above-described flow rate controller of the present invention, because the preset flow rate value and the measured flow rate value of the differential pressure flow meter are compared, and it is determined that an orifice clog fault has occurred when a flow rate difference at or above the predetermined value continues for a predetermined period of time or longer, it is possible to detect an orifice clog fault easily and accurately without having to provide additional equipment. Accordingly, a clogged state (fault) in which a foreign object such as a coagulate is attached to the orifice is automatically detected, and thus, continuation of the flow rate control in a state in which an error occurs in flow rate measurement can be prevented.

Furthermore, by additionally providing the monitoring pressure sensor, comparing the detected pressure value of the monitoring pressure sensor and the reference pressure value, which is determined in advance according to the preset flow rate value, and determining that an orifice clog fault has occurred when the pressure difference at or above the predetermined value continues for a predetermined period of time, an orifice clog fault is automatically detected with ease and accuracy, with the minimum of additional equipment; therefore, continuation of the flow rate control in a state in which an error occurs in flow rate measurement can be prevented.

Additionally, by acquiring the pulse position, which indicates the degree of opening of the flow-rate adjusting valve, comparing this pulse position and a reference pulse position, which is determined in accordance with the inlet pressure and the preset flow rate value, and determining that an orifice clog fault has occurred when the acquired pulse position continuously shows a deviation from the reference pulse position for a predetermined period of time, an orifice clog fault is automatically detected with ease and accuracy; therefore, continuation of the flow rate control in a state in which an error occurs in flow rate measurement can be prevented.

DETAILED DESCRIPTION OF THE INVENTION

An embodiment of a differential pressure flow meter and a flow rate controller according to the present invention will be described below, based on the drawings.

Figure 1:
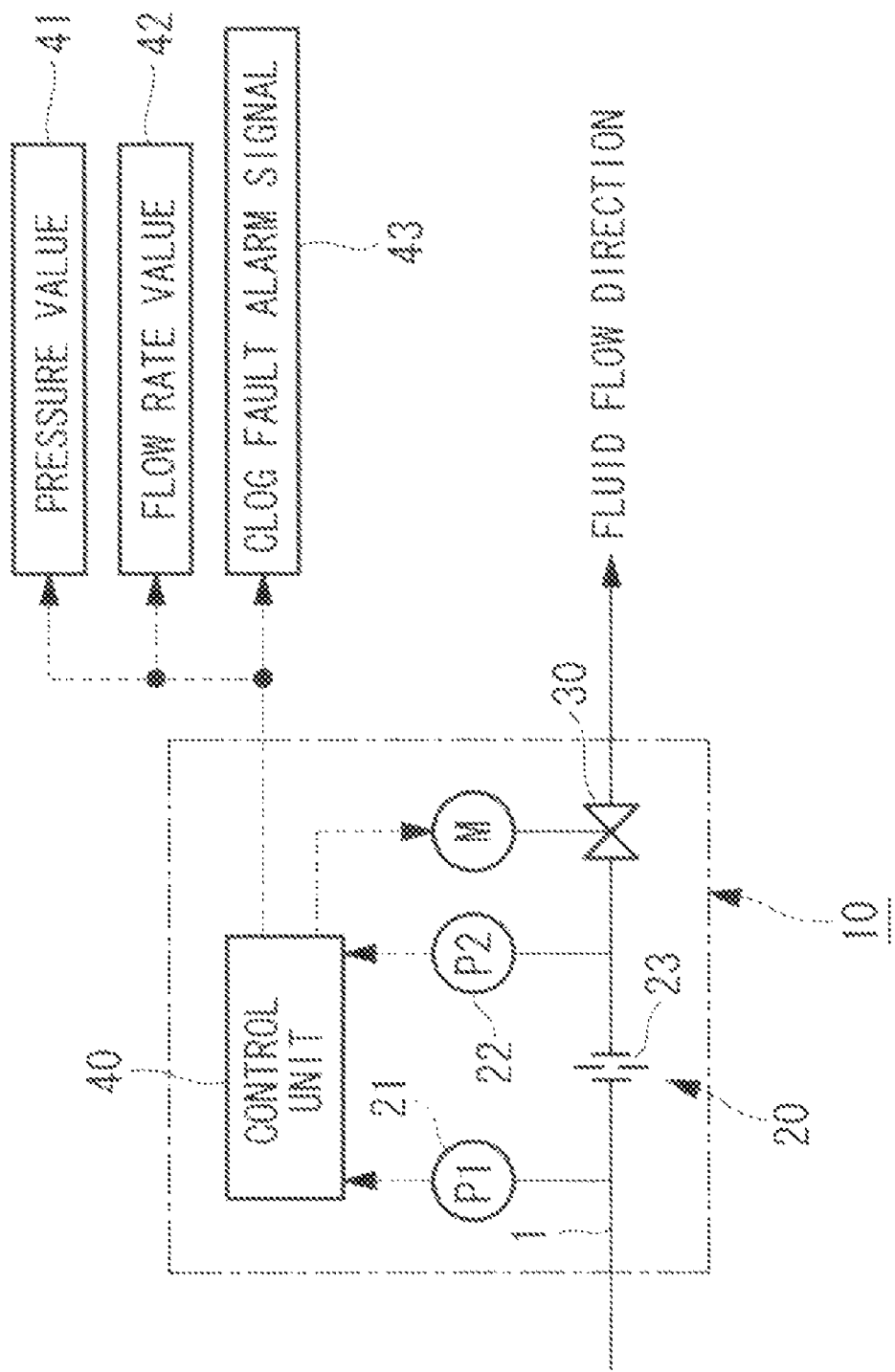
FIG. 1 is a configuration diagram showing an embodiment of a flow rate controller according to the present invention.
Figure 2:
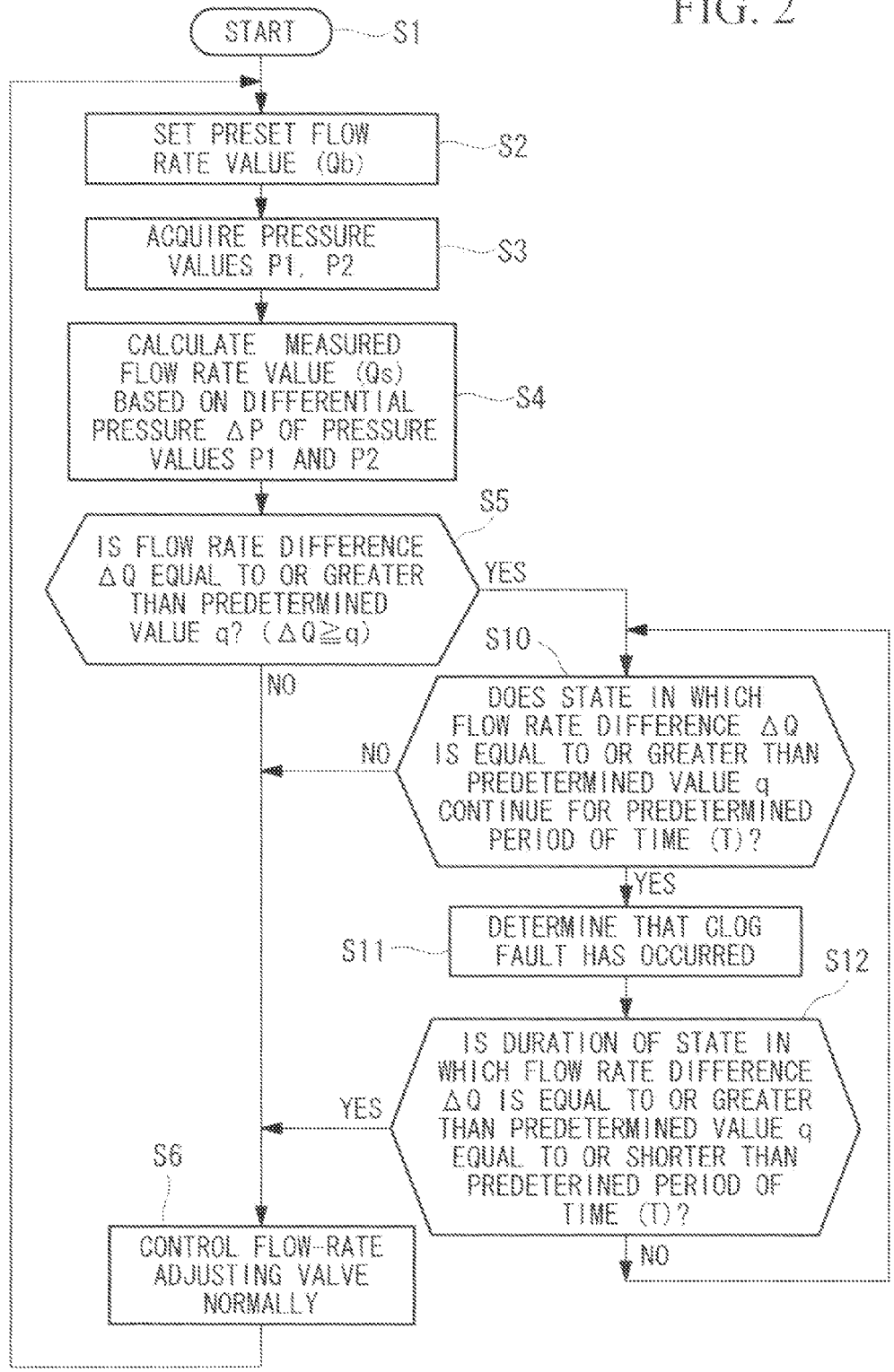
FIG. 2 is a flowchart showing a process by which the control unit shown in FIG. 1 determines the occurrence of a clog fault.

In this embodiment shown in FIGS. 1 and 2, a flow rate controller 10 is provided in a straight piping section 1 of a main fluid channel through which a fluid such as a reagent flows. This flow rate controller 10 is provided with a differential pressure flow meter 20 that is installed in the straight piping section 1, a flow-rate adjusting valve 30 that is installed at a position on the downstream side of the differential pressure flow meter 20 in the straight piping section 1, and a control unit 40 that controls the degree of opening of the flow-rate adjusting valve 30 based on a flow rate value detected by the differential pressure flow meter 20.

The differential pressure flow meter 20 is configured such that an orifice 23 is disposed between a pair of pressure sensors 21 and 22 that are installed in the straight piping section 1 with a predetermined space therebetween. This differential pressure flow meter 20 is a flow rate meter that obtains a fluid flow rate Q from a fluid pressure difference (differential pressure $\Delta P$) between the upstream side and the downstream side of the orifice 23, which causes a pressure loss. More specifically, the differential pressure flow meter 20 is configured such that a pressure value P1 detected by the pressure sensor 21, which detects fluid pressure on the upstream side of the orifice 23, and a pressure value P2 detected by the pressure sensor 22, which detects fluid pressure on the downstream side thereof, are input to the control unit 40 as electrical signals, and thereby flow rate measurement is carried out in the control unit 40 by converting the differential pressure $\Delta P$ to a flow rate.

In the following description, the flow rate value obtained by the flow rate measurement carried out by the differential pressure flow meter 20 is referred to as the "measured flow rate value Qs".

The degree of opening of the flow-rate adjusting valve 30 is controlled by receiving a control signal (pulse signal) output from the control unit 40. In controlling the degree of opening, in this case, the degree of opening is controlled by operating an actuator of the flow-rate adjusting valve 30 so that the difference between the measured flow rate value Qs obtained by the differential pressure flow meter 20 and a preset flow rate value Qb, which is determined in advance, falls within a predetermined range.

The control unit 40 controls the degree of opening of the flow-rate adjusting valve 30 by receiving the input pressure values P1 and P2 detected by the pressure sensors 21 and 22, respectively. In this control unit 40, in addition to the flow rate measurement whereby the measured flow rate value Qs is obtained by converting the differential pressure $\Delta P$ to a flow rate, the preset flow rate value Qb and the measured flow rate value Qs of the differential pressure flow meter are compared, and thereby, it is determined that a clog fault has occurred in the orifice 23 when a flow rate difference $\Delta Q$ at or above a predetermined value q continues for a predetermined period of time.

In this way, the control unit 40 can output a clog fault alarm signal 43 to an external unit, in addition to pressure values 41 such as the pressure values P1 and P2 detected by the pressure sensors 21 and 22, and a flow rate value 42 such as the measured flow rate value Qs obtained by converting the differential pressure $\Delta P$ to a flow rate.

Here, the process by which the control unit 40 determines that a clog fault has occurred in the orifice 23 and outputs the alarm signal 43 will be described based on a flowchart in FIG. 2.

When the control is initiated in the first step S1, proceeding to the next step S2, the flow rate controller 10 sets a target preset flow rate value Qb. This preset flow rate value Qb is a target value for the fluid flow rate at the downstream side of the flow-rate adjusting valve 30 and is set by input operation means such as a dial (not shown) provided in the control unit 40.

Subsequently, proceeding to the next step S3, the pressure values P2 and P2 detected by the pressure sensors 21 and 22 are acquired. In other words, the pressure values P1 and P2 detected by the pressure sensors 21 and 22 are input to the control unit 40.

In the next step S4, a differential pressure ΔP is determined based on the acquired pressure values P1 and P2, and a measured flow rate value Qs is calculated from this differential pressure ΔP.

Subsequently, proceeding to the next step S5, a determination is made as to whether there is a clog fault in the orifice 23. In this step S5, a flow rate difference ΔQ, which is the difference between the preset flow rate value Qb and the measured flow rate value Qs, is calculated first. In this case, the flow rate difference ΔQ is an absolute value of the difference between the preset flow rate value Qb and the measured flow rate value Qs. That is, whether the flow rate difference ΔQ is at or above q (ΔQ≧q) is determined for both cases where the measured flow rate value Qs is larger and smaller than the preset flow rate value Qb. In other words, it is determined whether the measured flow rate value Qs, which is the measured value from the differential pressure flow meter 20, falls within the range of the preset flow rate value Qb±q.

As a result, in the case of NO, where the flow rate difference ΔQ is determined to be smaller than the predetermined value q, proceeding to the next step S6, the flow-rate adjusting valve 30 is put under normal control. That is, it is determined that no clog fault has occurred in the orifice 23, and the degree of opening of the flow-rate adjusting valve 30 is controlled for normal operation. Note that, after carrying out normal control of the flow-rate adjusting valve 30 in step S6, the process returns to the above-described step S2 and similar control is repeated thereafter.

On the other hand, in the case of YES, where the flow rate difference ΔQ is determined to be at or above the predetermined value q in step S5, proceeding to the next step S10, a duration is determined. That is, for the a state in which the flow rate difference ΔQ is at or above the predetermined value q, it is determined whether the duration thereof is equal to or longer than a predetermined period of time T.

As a result, in the case of NO, where the duration is shorter than the predetermined period of time T, it is determined that no clog fault has occurred in the orifice 23, and, proceeding to the next step S6 described above, the flow-rate adjusting valve 30 is put under normal control. That is, the predetermined period of time T in this case serves as a reference to determine if the flow rate difference ΔQ is at or above the predetermined value q due to a clog fault or if the flow rate difference ΔQ is at or above the predetermined value q in the flow rate control process.

However, in the case of YES, where the duration is long, being equal to or longer than the predetermined period of time T, proceeding to the next step S11, it is determined that a clog fault has occurred in the orifice 23.

Subsequently, proceeding to the next step S12, it is determined whether the duration of a state in which the flow rate difference ΔQ is at or above the predetermined value q is equal to or shorter than the predetermined period of time T. That is, regarding the clog fault of the orifice 23, whether the clog fault remains or has been cleared is reconfirmed by performing the comparison with the predetermined period of time T again.

When the determination is YES, in step 12 described above, the clog fault of the orifice 23 is considered to be cleared. That is, regarding a state in which the flow rate difference ΔQ is equal to or larger than the predetermined value q, it is determined that the clog fault of the orifice 23 has been cleared when the duration is short, being equal to or shorter than the predetermined period of time T, and, proceeding to the next step S6 described above, the flow-rate adjusting valve 30 is put under normal control.

However, when the determination is NO in step S12, the clog fault of the orifice 23 is considered to remain. That is, regarding the state in which the flow rate difference ΔQ is equal to or larger than the predetermined value q, in the case of NO, wherein the duration is long, being equal to or longer than the predetermined period of time T, it is determined that the clog fault of the orifice 23 remains. Therefore, proceeding to step S10 described above, the determination regarding the predetermined period of time T is repeated.

When it is determined that there is a clog fault in step S11 described above, a clog fault alarm signal 43 is output from the control portion 40. Regarding the outputting of such an alarm signal, it may be immediately output when it is determined that a fault has occurred, or, in order to prevent a false alarm, it may be output when a predetermined number of fault determinations is reached while repeating steps S11 to S12.

With such a flow rate controller 10, the control unit 40 compares the preset flow rate value Qb and the measured flow rate value Qs of the differential pressure flow meter 20 and determines that a clog fault has occurred in the orifice 23 when a flow rate difference ΔQ at or above the predetermined value continues for a predetermined time T; therefore, it is possible to detect a clog fault easily and accurately without having to provide additional equipment.

Figure 3:
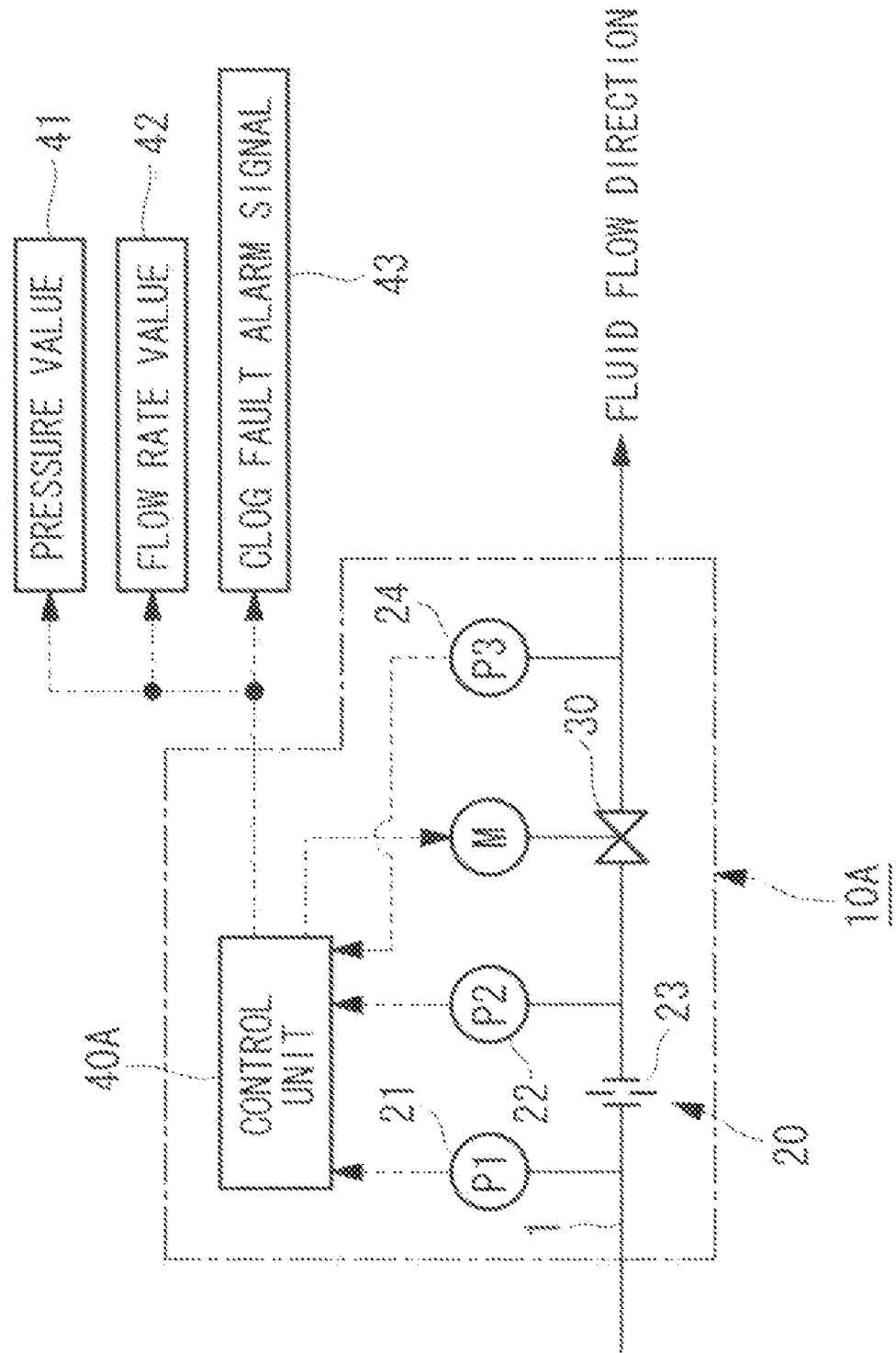
FIG. 3 is a configuration diagram showing a first modification of the flow rate controller in FIG. 1.

Next, a first modification of the above-described flow rate controller 10 will be described based on FIGS. 3 and 4. Note that portions similar to those of the embodiment described above are denoted by the same reference signs, and detailed descriptions thereof will be omitted.

In this modification, a flow rate controller 10A differs from the flow rate controller 10 of the above-described embodiment in that it is provided with a monitoring pressure sensor 24 for monitoring clogging at the downstream side of the flow-rate adjusting valve 30. In this case, a control unit 40A compares a reference pressure value Pb from the monitoring pressure sensor 24, which is determined in advance in accordance with the preset flow rate value Qb, and a detected pressure value P3 from the monitoring pressure sensor 24, and determines that a clog fault has occurred in the orifice 23 when a pressure difference ΔP' at or above a predetermined value Pa continues for a predetermined time Ta.

Figure 4:
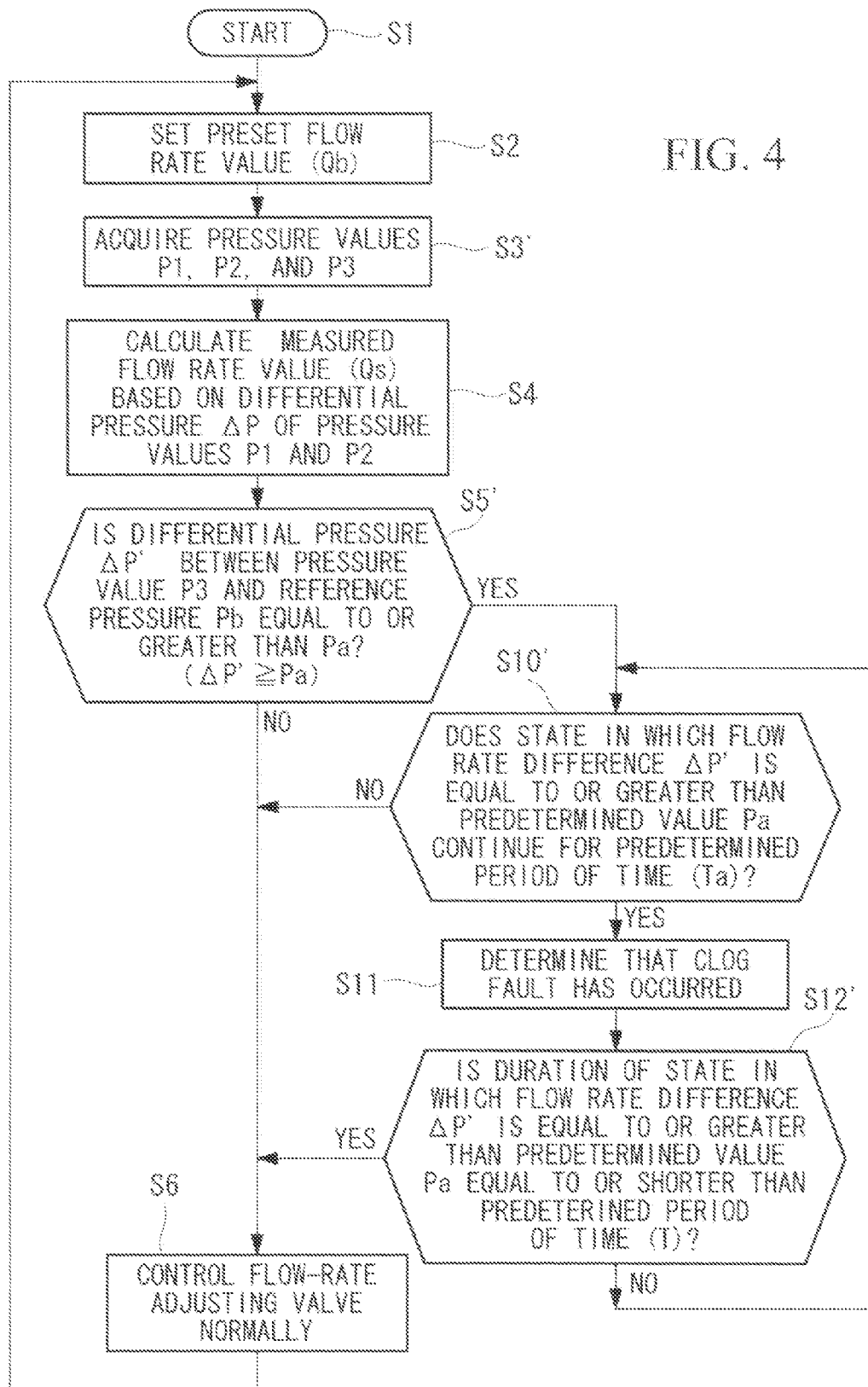
FIG. 4 is a flowchart showing a process by which the control unit shown in FIG. 3 determines the occurrence of a clog fault.

In other words, in a flowchart shown in FIG. 4, pressure values acquired in step S3' include three pressure values P1, P2, and P3 detected by the pressure sensors 21 and 22, and the monitoring pressure sensor 24 for monitoring clogging.

In addition, in steps S5', S10', and S12', instead of the flow rate difference ΔQ in the above-described embodiment, the pressure value P3, the reference pressure Pb, and the pressure difference ΔP' are employed as references for the determination.

That is, in step S5', it is determined whether the pressure difference ΔP' is equal to or greater than the predetermined value Pa; furthermore, in steps S10' and S12', it is determined whether a state in which the pressure difference ΔP' is equal to or greater than the predetermined value Pa continues for the predetermined time Ta.

With such a flow rate controller 10A, with the mere addition of the monitoring pressure sensor 24 for monitoring, the control unit 40A compares the reference pressure value Pb, which corresponds to the preset flow rate value Qb, from the monitoring pressure sensor 24 and the detected pressure value P3 from the monitoring pressure sensor 24, and thus, a clog fault in the orifice 23 can be easily and accurately detected.

As described above, with the flow rate controller 10 of the present invention; because the preset flow rate value Qb and the measured flow rate value Qs of the differential pressure flow meter 20 are compared, and it is determined that a clog fault has occurred in the orifice 23 when a flow rate difference ΔQ at or above the predetermined value q continues for a predetermined period of time T or longer, it is possible to detect a clog fault easily and accurately without having to provide additional equipment.

Furthermore, by additionally providing the monitoring pressure sensor 24, by comparing a reference pressure value Pb from the monitoring pressure sensor 24, which is determined in advance in accordance with the preset flow rate value Qb, and a detected pressure value P3 from the monitoring pressure sensor 24, and by determining that a clog fault has occurred in the orifice 23 when a pressure difference ΔP' at or above the predetermined value Pa continues for or longer than the predetermined time Ta, a clog fault in the orifice 23 can be detected easily and accurately with the minimum of additional equipment.

Figure 5:
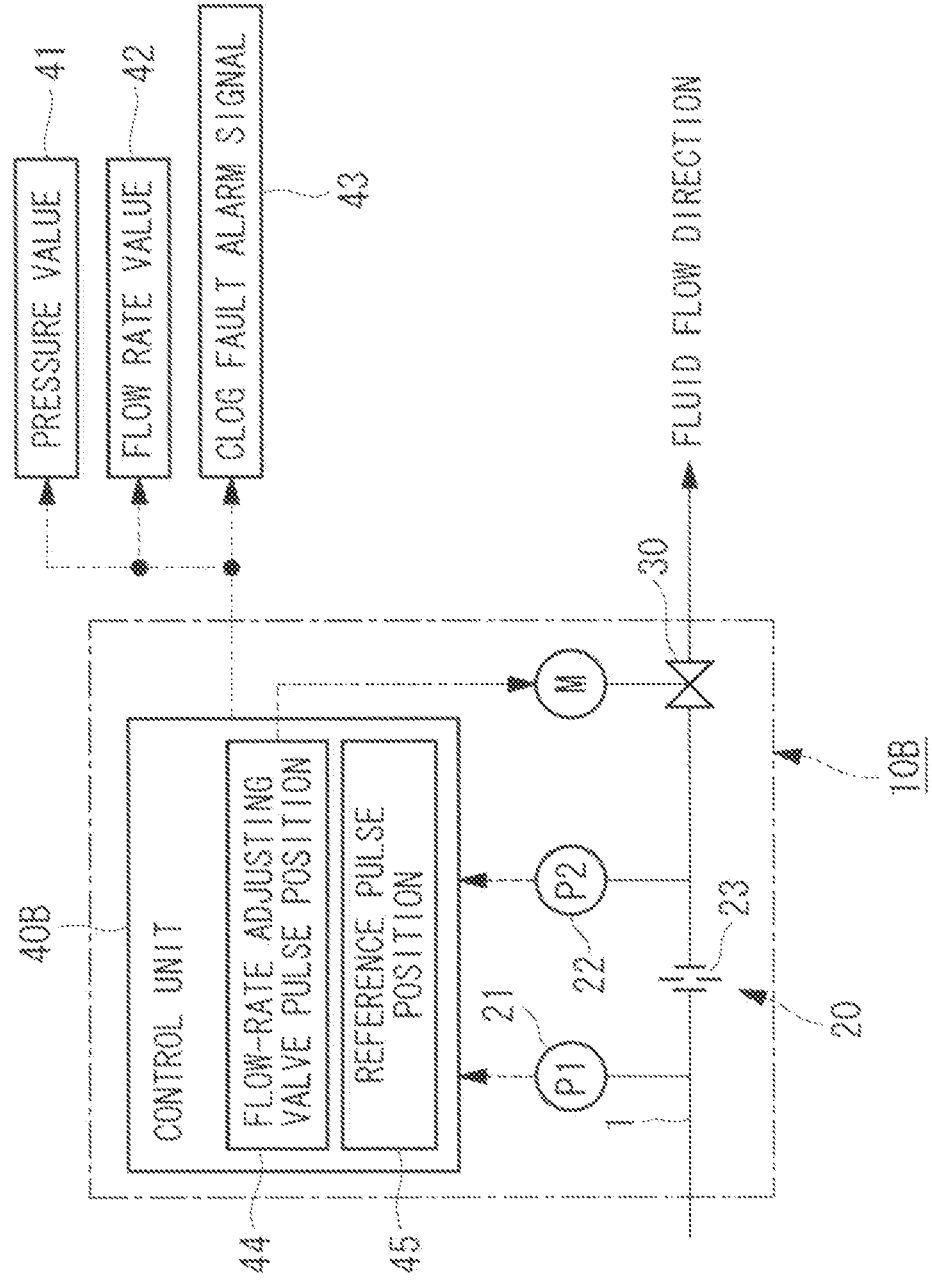
FIG. 5 is a configuration diagram showing a second modification of the flow rate controller in FIG. 1

Next, a second modification of the above-described flow rate controller 10 will be described based on FIGS. 5 and 6. Note that, portions similar to those of the embodiment described above are denoted with the same reference signs, and detailed descriptions thereof will be omitted.

In this modification, a flow rate controller 10B, unlike the flow rate controller 10 in the above-described embodiment, acquires a flow rate adjusting valve pulse position 44, which indicates the degree of opening of the flow-rate adjusting valve 30, and compares this flow rate adjusting valve pulse position 44 with the inlet pressure and the preset flow rate value Qb.

The flow rate adjusting valve pulse position 44 in this case indicates the current degree of opening (actual degree of opening) of the flow-rate adjusting valve 30 and it is also the actual pulse position (number of pulses) used to drive a pulse motor of an actuator to achieve this degree of opening. In other words, the flow rate adjusting valve pulse position 44 is the pulse position after the degree of opening of the flow-rate adjusting valve 30 is corrected in accordance with the measured flow rate value Qs from the differential pressure flow meter 20.

On the other hand, a reference pulse position 45 is a pulse position in an ideal state determined in accordance with the inlet pressure and the preset flow rate value Qb. That is, it is a theoretical pulse position (number of pulses) for driving a pulse motor in order to achieve the degree of opening of the flow-rate adjusting valve 30 determined by a pressure value P1 detected by the pressure sensor 21 at the upstream side of the orifice 23 and the target preset flow rate value Qb. In other words, the reference pulse position (number of pulses) is the pulse position before the degree of opening of the flow-rate adjusting valve 30 is corrected in accordance with the measured flow rate value Qs from the differential pressure flow meter 20.

In the flow rate controller 10B, the flow-rate adjusting valve pulse position 44 and the reference pulse position 45 are compared, and it is determined that a clog fault has occurred in the orifice 23 when there is a continued deviation between the two pulse positions for a predetermined period of time.

Figure 6:
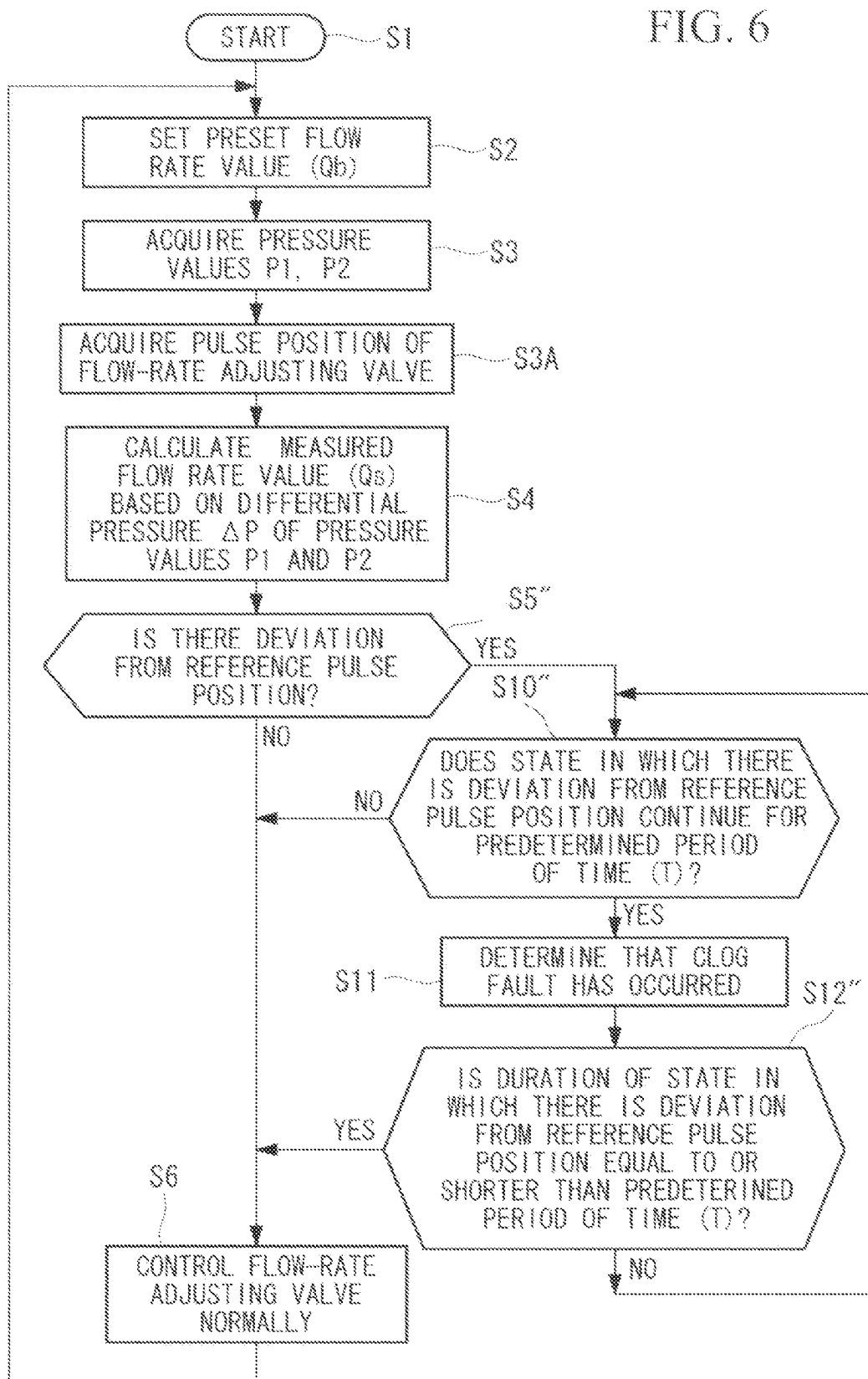
FIG. 6 is a flowchart showing a process by which the control unit shown in FIG. 5 determines the occurrence of a clog fault.

That is, the flow rate adjusting valve pulse position 44 is acquired as control data in step S3A in the flowchart shown in FIG. 6. With this flow rate adjusting valve pulse position 44, after calculating the measured flow rate value Qs in step S4, it is determined in step S5" whether there is a deviation from the reference pulse position 45. More specifically, a difference between the reference pulse position 45 and the flow-rate adjusting valve pulse position 44, which is acquired in step S3A, is determined, and the process proceeds to the next step S10" in the case of YES, where the difference is equal to or greater than a predetermined value.

In Step S10" the duration of the state in which the difference between the flow-rate adjusting valve pulse position 44 and the reference pulse position 45 is equal to or greater than the predetermined value is measured, and it is determined that a clog fault has occurred in the case of YES, where the duration is equal to or greater than a predetermined time T.

Thereafter, the process advances to step S12" to determine whether the duration of the state in which the difference between the flow rate adjusting valve pulse position 44 and the reference pulse position 45 is equal to or greater than the predetermined value is equal to or shorter than the predetermined period of time T. That is, regarding the clog fault state of the orifice 23, by performing the comparison with the predetermined time T again, it is reconfirmed whether the clog fault remains or has been cleared.

When the determination is YES in the above-described step S12", it is considered that the clog fault in the orifice 23 has been cleared. That is, regarding the state in which the pulse positions deviate by the predetermined value or greater, in the case of YES, where the duration is equal to or shorter than the predetermined period of time T, it is determined that the clog fault in the orifice 23 has been cleared, and, proceeding to step S6, the flow-rate adjusting valve 30 is placed under normal control.

However, when the determination is NO in step S12", it is considered that the clog fault in the orifice 23 remains. That is, regarding the state in which the pulse positions deviate by the predetermined value or greater than the predetermined value, in the case of NO, where the duration is longer than the predetermined period of time T, it is determined that the clog fault in the orifice 23 remains. Therefore, the process advances to the above-described step S10, and the determination about the predetermined time T is repeated.

By employing such a flow rate controller 10B and taking advantage of the property of the flow-rate adjusting valve 30 that when the inlet pressure (pressure value P1) changes, the flow rates differs even at the same pulse position (degree of opening), it is possible to easily and accurately detect a clog fault in the orifice 23.

Therefore, in the flow rate controllers 10, 10A, and 10B of the present invention, a clogged state (fault) wherein a foreign object such as a coagulate is attached to the orifice 23 is automatically detected, and the continued flow rate control in a state in which an error occurs in the measured flow rate value from the differential pressure flow meter 20 can be prevented.

When a fault is caused by a failure or breakdown, etc. of the pressure sensors 21 or 22, because the measured flow rate value Qs in the above-described step S4 differs from a measured value during the normal operation, a state that is equivalent to the clogged state results, and the alarm signal 43 for the clog fault is output. Therefore, the above-described alarm function can also detect the fault in the measured values from the pressure sensors 21 and 22 as an error.

Note that the present invention is not limited to the above-described embodiments; appropriate modifications are possible without departing from the spirit of the present invention.

What is claimed is:
1. A flow rate controller comprising:
a differential pressure flow meter, wherein an orifice is disposed between a pair of pressure sensors provided in a straight piping section of a main fluid channel, the differential pressure flow meter carrying out flow rate measurement by converting a pressure difference obtained from two pressure values detected by the pressure sensors to a flow rate;

a flow-rate adjusting valve that is provided in the main fluid channel and whose degree of opening is controlled such that the difference between a measured flow rate value of the differential pressure flow meter and a preset flow rate value determined in advance falls within a predetermined range; and a control unit that controls the degree of opening of the flow-rate adjusting valve upon receiving as inputs the pressure values detected by the pressure sensors, wherein the control unit compares the preset flow rate value and the measured flow rate value of the differential pressure flow meter and automatically determines that there is a clog fault in the orifice when a flow rate difference equal to or greater than a predetermined value continues for a predetermined period of time or longer under controlled conditions.

2. The flow rate controller according to claim 1, wherein the flow rate is measured for a liquid.

* * * * *